Nov. 28, 1967         J. L. CHRISTMANN         3,354,698
                     MASS MEASURING SYSTEM
Filed Jan. 21, 1965                          7 Sheets-Sheet 3
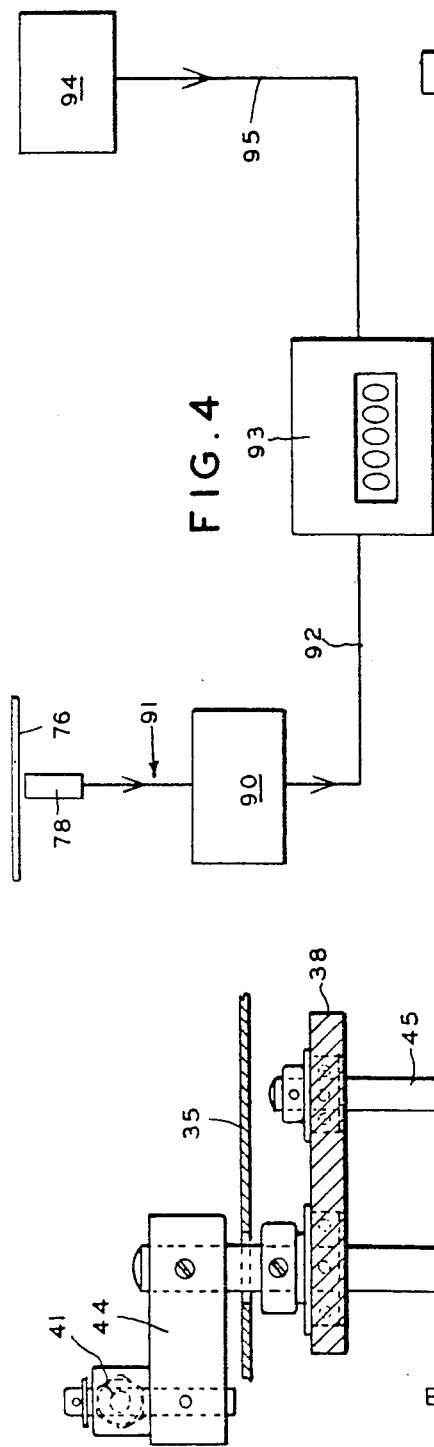
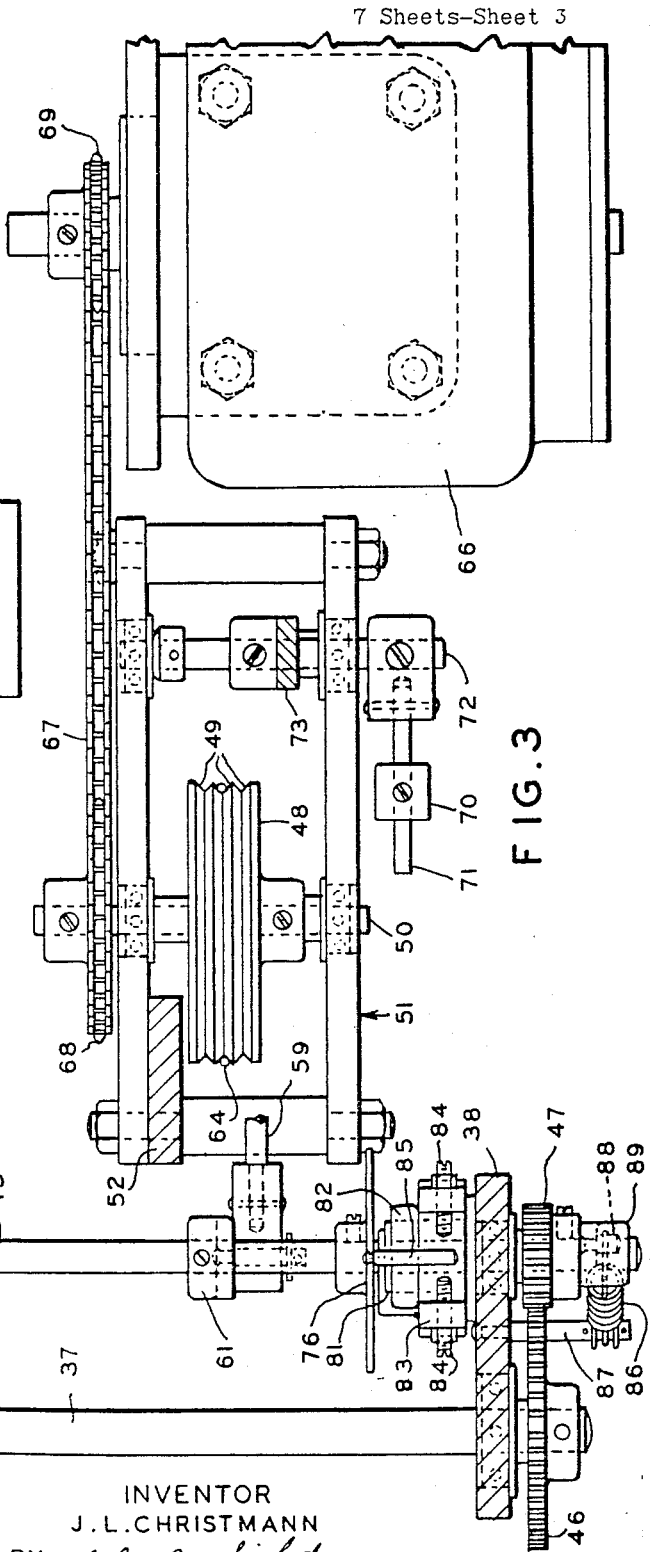
INVENTOR
J. L. CHRISTMANN
BY John A. Seifert
ATTORNEY Nov. 28, 1967   J. L. CHRISTMANN   3,354,698
MASS MEASURING SYSTEM
Filed Jan. 21, 1965   7 Sheets-Sheet 4
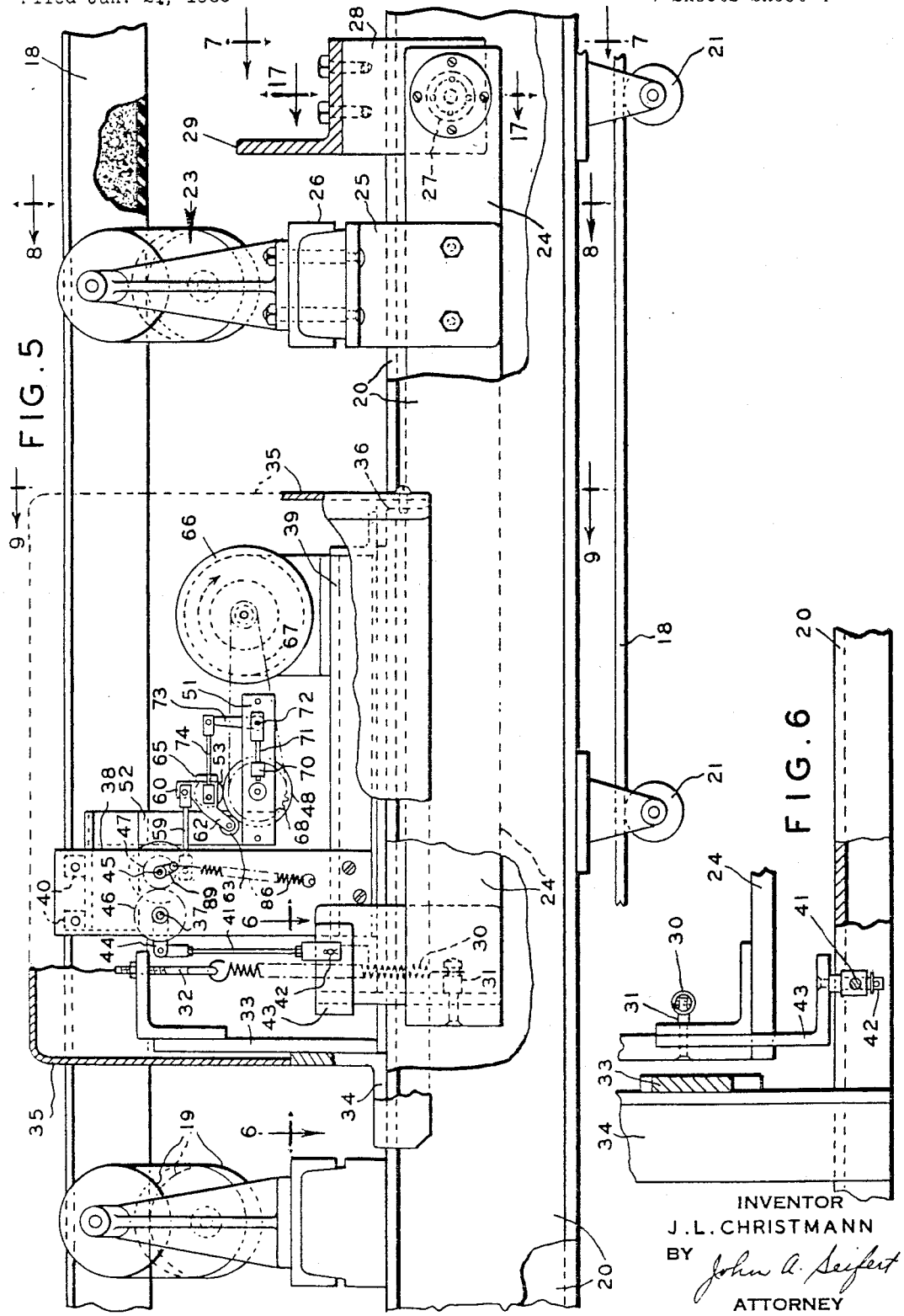
INVENTOR
J.L. CHRISTMANN
BY John A. Seifert
ATTORNEY Nov. 28, 1967  J. L. CHRISTMANN  3,354,698
MASS MEASURING SYSTEM
Filed Jan. 21, 1965  7 Sheets-Sheet 5
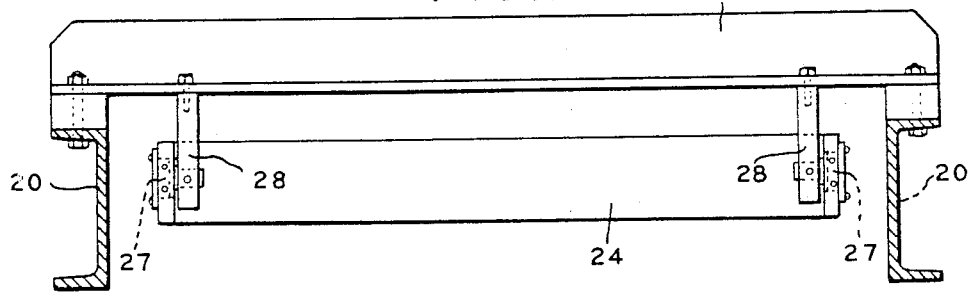
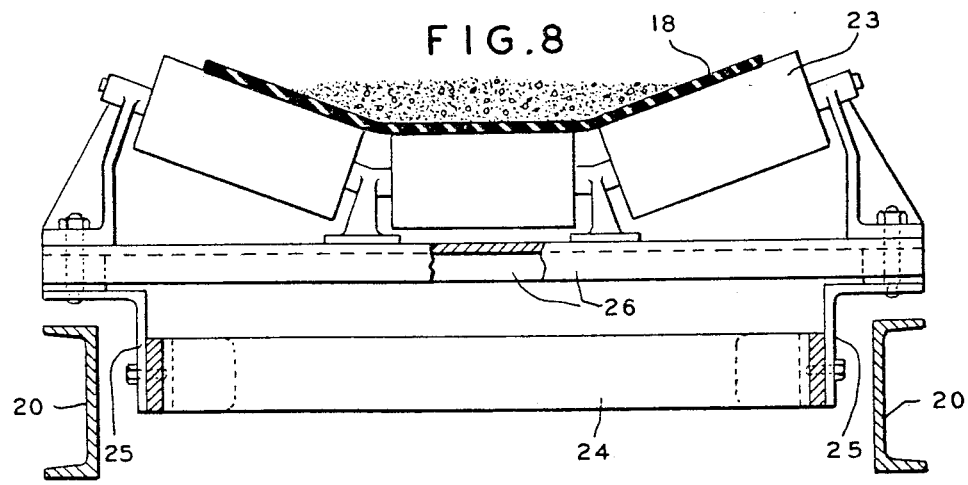
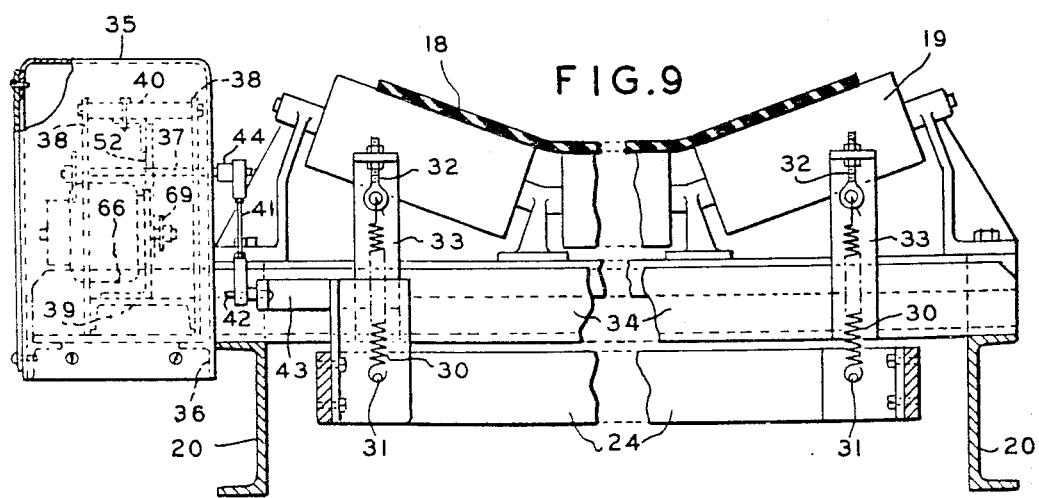
INVENTOR
J. L. CHRISTMANN
BY John A. Seifert
ATTORNEY Nov. 28, 1967  J. L. CHRISTMANN  3,354,698
MASS MEASURING SYSTEM
Filed Jan. 21, 1965  7 Sheets-Sheet 6
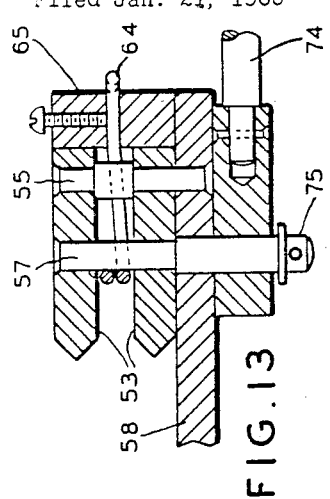
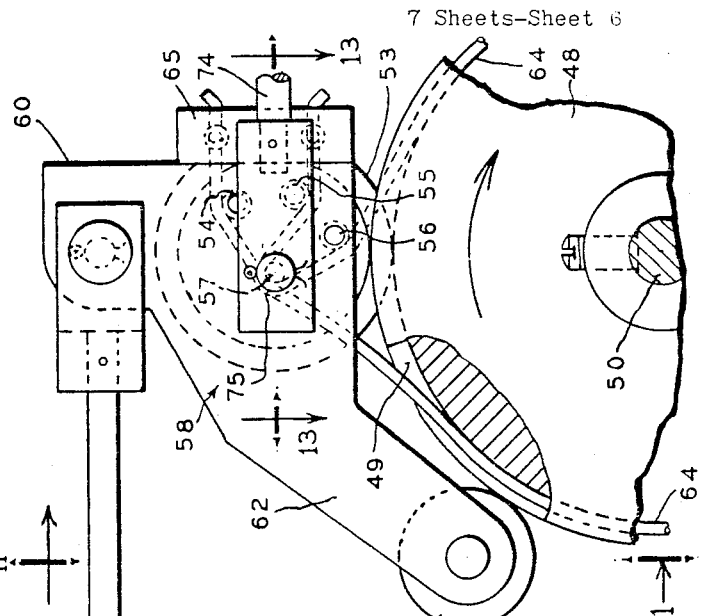
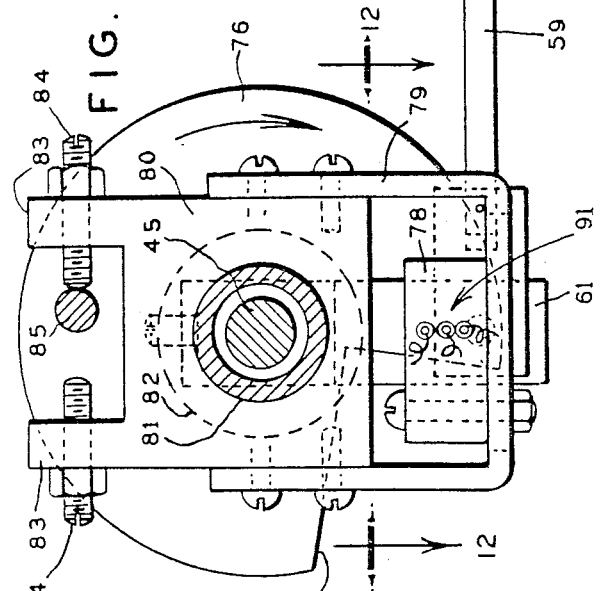
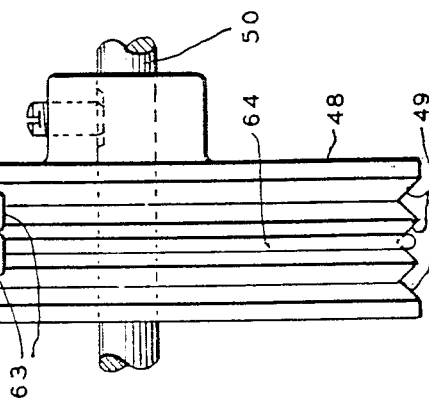
INVENTOR
J. L. CHRISTMANN
BY John A. Seifert
ATTORNEY

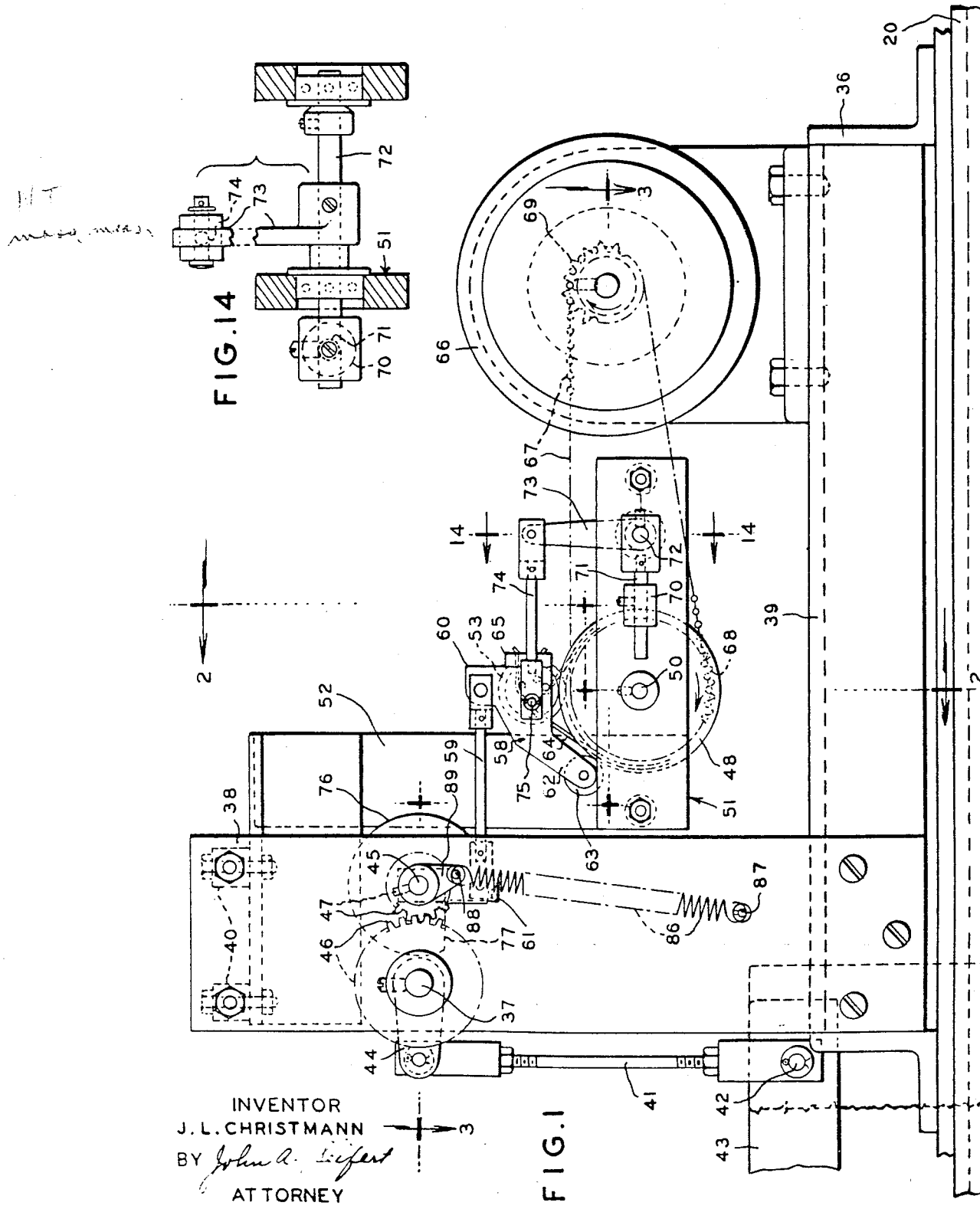

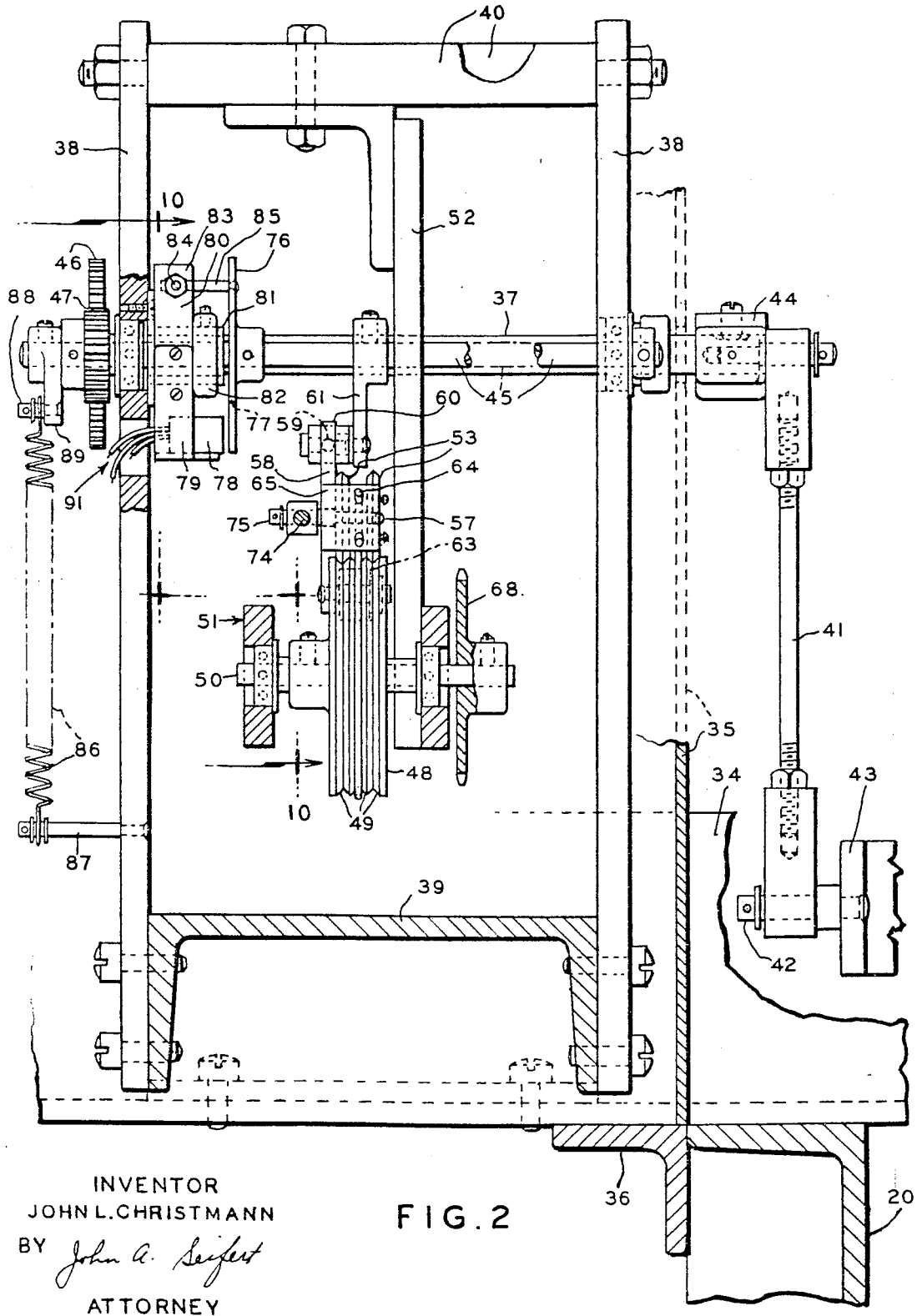

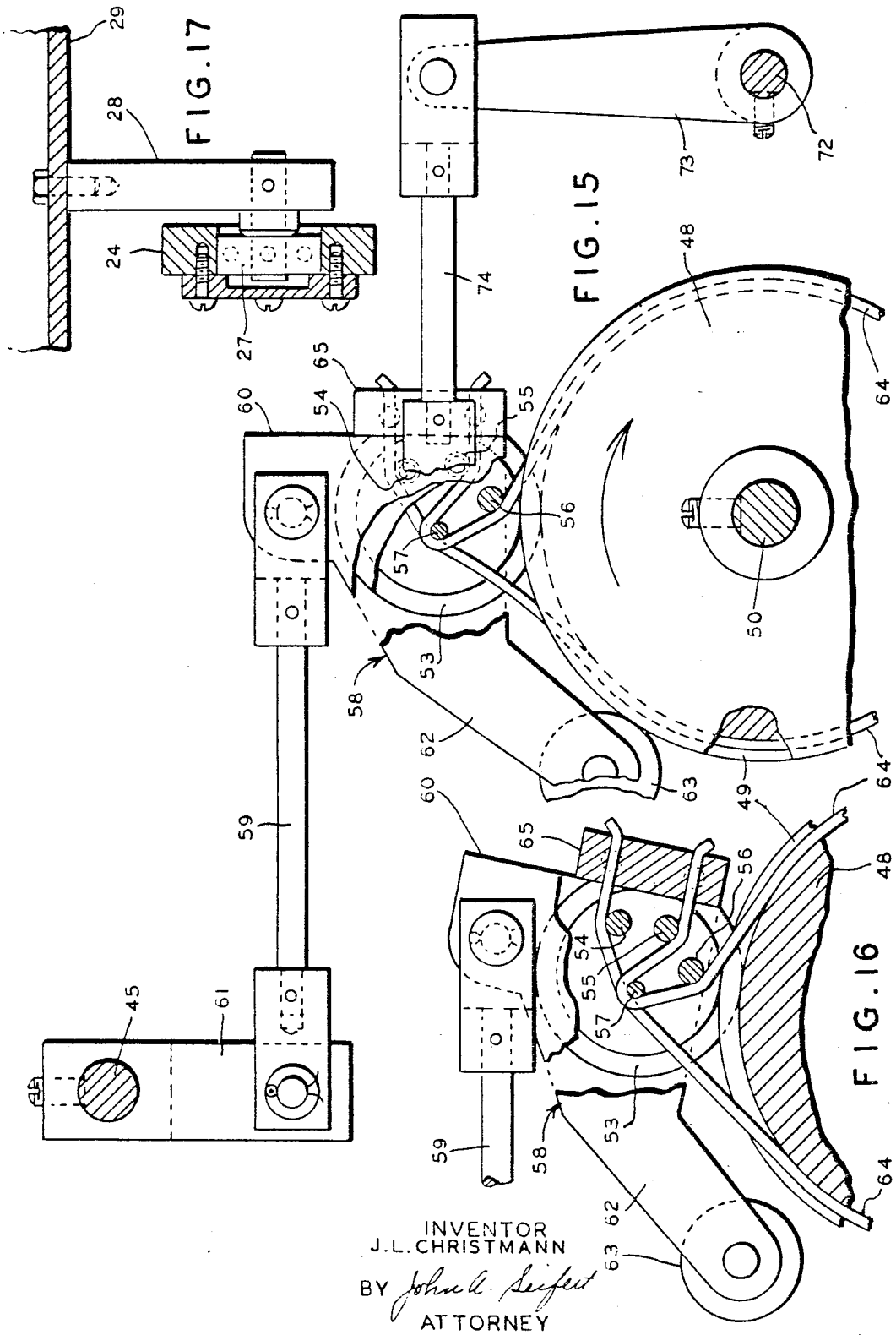

United States Patent Office 3,354,698
Patented Nov. 28, 1967

3,354,698
MASS MEASURING SYSTEM
John L. Christmann, Passaic, N.J., assignor to Merrick Scale Mfg. Company, Passaic, N.J., a corporation of New Jersey
Filed Jan. 21, 1965, Ser. No. 426,802
12 Claims. (Cl. 73—67.2)

ABSTRACT OF THE DISCLOSURE

The present invention requires four main components comprising an elastic member supporting a load, an excitation unit to sustain the oscillations of the elastic member, a sensing unit actuated by the excitation unit to count the oscillations, and means to linearize the frequency response or oscillations of the mass. The elastic member could be a load platform either supported by helical springs for low frequency response wherein mechanical means are adequate for the excitation unit, or flat springs are used for higher frequencies to support the load with the free ends of the springs excited by electromagnetic action.

---

This type of scale is not affected by forces influencing conventional conveyor scales. Such forces are due to the effect of belt tension on the scale suspension or platform and due to idler misalignment, improper troughing and tracking of the belt, scale location on the conveyor, suspension deflection under load, length of the suspension, to mention a few of the factors affecting scale accuracy in addition to frictional forces. The conventional scales measure weight by weight comparison, such as a poise weight on a graduated beam, deflection by a pendulum beam or a beam equipped with a mercury dashpot, or by force comparison, such as spring scales, load cells and strain gages, and therefore cannot discriminate between weight and force.

The present invention eliminates these adverse influences since a force acting on a mass measuring system will affect the static deflection and the amplitude of vibration but not the frequency.

The principle involved in this invention is based on the theory that any element capable of elastic deformation, such as a spring, is subject to oscillation when properly excited.

The period of vibration of such a spring is given by the formula:

$$t = 2\pi \sqrt{\frac{\sigma}{g}}$$

Where $g$=gravitational acceleration and $\sigma$=deflection produced by the load. The frequency $f$ is therefore expressed by the following formula:

$$f = \frac{1}{2\pi} \sqrt{\frac{g}{\sigma}}$$

On helical springs we can substitute for $\sigma$ the static deflection under load $$W : \sigma = \frac{W}{K}$$

Where K is the spring constant on the force necessary to produce a deflection equal to unity.
The frequency is then:

$$f = \frac{1}{2\pi} \sqrt{\frac{gK}{W}} = \frac{1}{2\pi} \sqrt{\frac{K}{Mass}}$$

The latter expression shows that since K is a constant, the frequency varies inversely with the mass. For a flat cantilever spring the frequency $f$ would be:

$$f = \frac{1}{2\pi} \sqrt{\frac{3EI}{ml^3}}$$

$E$=Modulus of elasticity.
$I$=Moment of inertia.
$l$=Lenth of flat spring.
$M$=Mass.

The mass of the spring is not considered, being small in comparison to load.

Such an elastic element can therefore be used to measure mass. In this type of measuring system, the frequency will depend only on the mass imposed, and can be used for static or dynamic weighing.

Further advantages of the invention will be set forth in the detailed description of the invention.

In the drawings accompanying and forming a part of this application:

FIGURE 1 is an elevational view of the excitation and sensing units of the invention;

FIGURE 2 is a cross-sectional view, on an enlarged scale, taken on the line 2—2 of FIGURE 1 looking in the direction of the arrows;

FIGURE 3 is a plan sectional view, on an enlarged scale, taken on the line 3—3 of FIGURE 1 looking in the direction of the arrows;

FIGURE 4 is a schematic view of the electric circuit of the sensing unit, an adjustable frequency pulse generator to balance the sensing unit, and an add-subtract counter;

FIGURE 5 is an elevational view of the excitation and sensing units in conjunction with a spring-suspended and pivoted load platform on a belt conveyor;

FIGURE 6 is a fragmentary sectional view taken on the line 6—6 of FIGURE 5 looking in the direction of the arrows to show the elastic suspension of the load platform and its connection to the excitation unit;

FIGURE 7 is a cross-sectional view, on a reduced scale, taken on the line 7—7 of FIGURE 5 looking in the direction of the arrows to show the pivotal mounting of the load platform;

FIGURE 8 is a cross-sectional view taken on the line 8—8 of FIGURE 5 looking in the direction of the arrows to show the mounting of a conveyor belt idler on the load platform;

FIGURE 9 is a cross-sectional view taken on the line 9—9 of FIGURE 5 looking in the direction of the arrows to show the spring mounting of the load platform and its connection to the excitation unit;

FIGURE 10 is an elevational view of the excitation and sensing units including brake mechanism of the excitation unit;

FIGURE 11 is an end view of the brake mechanism looking from the line 11—11 of FIGURE 10 in the direction of the arrows;

FIGURE 12 is a sectional view taken on the line 12—12 of FIGURE 10 looking in the direction of the arrows to show the mounting of the sensing unit;

FIGURE 13 is a fragmentary sectional view taken on the line 13—13 of FIGURE 10 looking in the direction of the arrows;

FIGURE 14 is a sectional view, on an enlarged scale, take non the line 14—14 of FIGURE 1 looking in the direction of the arrows to show part of the brake mechanism;

FIGURE 15 is an elevational view of the brake mechanism in unactuated position;

FIGURE 16 is a fragmentary view of the brake mechanism with a carriage broken-away to show a braking cable in locking position; and FIGURE 17 is a sectional view, on an enlarged scale, taken on the line 17—17 of FIGURE 5, looking in the direction of the arrows to show the pivotal mounting of the load platform.

The invention is shown in combination with an endless belt conveyor 18 having the upper or load carrying stretch supported by trough forming idlers 19 mounted on laterally spaced stringers 20 of the usual frame structure, not shown. The lower stretch of the conveyor 18 is guided by idlers 21, as shown in FIGURE 5. A portion of the upper stretch of the conveyor 18 is supported by an idler 23 mounted on a load platform comprising a rectangular frame 24 having angle blackets 25 secured to a board 26 of the idler 23, as shown in FIGURES 5 and 8. The brackets 25 are mounted adjacent one end of the frame 24 and said end of the frame 24 is pivotally mounted on bearings 27 supported by hangers 28 secured to a tie-beam 29 mounted on the stringers 20, as shown in FIGURES 5, 7 and 17. The opposite end of the frame 24 is elastically supported by helical springs 30, each spring being anchored at one end to a pin 31 fixed to an end member of the frame 24 and the opposite end of each spring is connected to an eye bolt 32 adjustably mounted in a bracket 33 secured on a tie-beam 34 supported by the stringers 20.

A mass of the load on the conveyor 18 passing over the idler 23 will extend the springs 30 and an excitation unit will cause the springs 30 and the suspension frame 24 to oscillate and the frequency response to be counted.

This is accomplished by excitation and sensing units enclosed in a casing 35 mounted on one of the stringers 20, as shown at 36 in FIGURES 2, 5 and 9.

The excitation unit comprises an input shaft 37 rotatably mounted in standards 38 secured to a base 39 with the upper end portions of the standards connected by spacers 40. The oscillations of the springs 30 are imparted to the input shaft 37 by a link 41 having the lower end pivotally connected to a pin 42 fixed to a bracket 43 mounted on the end member of the frame 24 having the springs 30 anchored thereto, as shown in FIGURES 5 and 6. The opposite end of the link 41 is pivotally connected to a crank 44 fixed on an end portion of the input shaft 37 projecting from the casing 35. A second shaft 45 is rotatably mounted in the standards 38 and operatively connected to the input shaft 37 by a gear 46 fixed on the input shaft 37 and meshing with a pinion 47 secured on the second shaft 45, as shown in FIGURES 1, 2, 3 and 5.

To induce the springs 30 and the shafts 37 and 45 to oscillate at their natural frequency and sustain the oscillation against frictional losses, there is provided brake mechanism comprising a sheave 48 having three peripheral grooves 49 and secured on a shaft 50 rotatably mounted in the side members of a frame 51 suspended by a hanger 52 from the spacers 40. There are provided two discs 53 having beveled peripheries engaged in the two outer grooves 49 of the sheave 48 and spaced apart by pins 54, 55, 56 and 57. One end of each of said pins is secured in a plate 58 to fasten the discs on said plate. The plate 58 is connected to the second shaft 45 by a link 59 having one end pivotally connected to a vertical extension 60 of the plate. The opposite end of the link 59 is pivotally connected to a crank 61 secured on the second shaft 45. The plate 58 is provided with an oblique extension 62 having two ball bearings 63 riding on the ridges between the grooves 49 to prevent the plate 58 tipping to the left of its radial alignment looking at FIGURES 1, 5, 10, 15 and 16. A cable 64 is wrapped once around the center groove of the sheave 48 with the opposite ends anchored in vertical alignment in a block 65 secured to the discs 53 and the plate 58. The portion of the cable extending from the upper anchorage is passed over the pins 54 and 57, and the portion of the cable extending from the lower anchorage is passed under the pins 55 and 56 and over the pin 57. The sheave 48 is continuously rotated by a synchronous motor 66 through a sprocket chain 67 engaging a sprocket wheel 68 secured on the shaft 50 and a sprocket wheel 69 secured on the drive shaft of the motor 66. The motor 66 is mounted on the base 39.

During part of the upward swing of the load platform 24, the shaft 37 is rotated in a clockwise direction and the shaft 45 is rotated in a counter-clockwise direction which will move the plate 58 in a clockwise direction around the pin 57 looking at FIGURES 1 and 5. Since the pin 57 is eccentrically located on the discs 53, the pin 56 is moved to the left thereby tightening the cable 64 on the sheave 48. The plate 58 is then locked on the sheave 48 and driven to the right by the continuous rotation of said sheave.

Inertia is imparted to the movement of the plate 58 to the right by a weight 70 adjustably mounted on a rod 71 secured to a projecting end of a shaft 72 rotatably mounted in the side members of the frame 51 in the horizontal plane of the shaft 50. An arm 73 is secured on an intermediate portion of the shaft 72 and pivotally connected to a link 74 pivotally connected to a projecting end of the pin 57, as shown at 75 in FIGURE 13.

When the oscillating swing of the load platform 24 reverses or is in the downward direction, the crank 61 on the second shaft 45 swings to the left, looking at FIGURES 1, 5 and 10, and the plate 58 returns to its normal or radial position and the cable unlocks. The cable 64 is adjusted with just enough drag so that the system is self-starting.

The swinging of the plate 58 to the right imparts an impulse and each impulse is counted by a sensing unit comprising a disc 76 of ferrous material having a cut-out 77 with a radial edge and secured on the shaft 45, as shown in FIGURES 1, 2, 3 and 10. An induction-coil 78 is carried by a U-shaped bracket 79 having the leg portions secured to a block 80 rotatable on a sleeve 81 fixedly supported on the adjacent standard 38 to be concentrically spaced around the shaft 45 and said block 80 being retained on the sleeve 81 by a collar 82, as shown in FIGURES 2 and 10, so that the induction-coil 78 can swing freely. This movement is necessary since the springs 30 assume a different static deflection for each load imposed and oscillation takes place about that particular level. The upper portion of the block 80 is provided with spaced ears 83 and an abutment screw 84 is adjustably mounted in each ear to be engaged by a pin 85 projecting from the disc 76, said engagement swinging the bracket 79 to different positions depending on the load imposed on the load platform frame 24. The oscillations of the disc 76 will alternately move the solid part and the cut-out 77 past the induction-coil 78, and when the induction-coil senses the cut-out 77, an impulse is transmitted by the induction-coil whereby the oscillations are counted.

A bias spring 86 is anchored at one end to a pin 87 extended from a standard 38 with the opposite end of the spring 86 connected to a pin 88 extended from a crank 89 adjustably mounted on the second shaft 45 whereby the frequency response is linearized. Since the frequency range over which the system operates is limited, the deviation from linearity is small. As previously mentioned, the system oscillates about different positions for each imposed load. The crank 89 is adjusted on the second shaft 45 to the proper angle so that the bias spring 86 will cause a slight change in the spring constant of the springs 30 depending on the load thereby compensating for the slight non-linearity.

At no-load or balance the springs 30 contract and the crank 89 will oscillate to the right of the vertical center, as shown in FIGURES 1 and 5, and at full load when the springs 30 extend, the crank 89 will oscillate to the left of the vertical center. As the crank 89 moves toward either of these extreme positions and oscillates about these positions, the tension of the bias spring 86 will increase thereby decreasing the deflection σ of the springs 30 and increasing the frequency f according to the formula:

$$f = \frac{1}{2\pi}\sqrt{\frac{g}{\sigma}}$$

and thereby linearizing the response. The bias spring 86 actually has the effect of slightly increasing the spring constant K in the formula $$f = \frac{1}{2\pi}\sqrt{\frac{K}{m}}$$

increasing the frequency to linearize the response.

FIGURE 4 shows the method of registering the mass or corresponding weight conveyed comprising an amplifier and relay 90 connected by conductors 91 to the induction-coil 78 and by conductors 92 to an add-subtract counter 93. An adjustable frequency pulse generator 94 is connected by conductors 95 to the add-subtract counter 93. The conveyor 18 is operated at a constant speed so that no speed compensation is provided.

Since the system operates at high frequency for no-load or balance and at low frequency for full load, the count pulses from the induction-coil 78 have to be subtracted from the count pulses supplied by the adjustable frequency pulse generator 94. The adjustable frequency pulse generator 94 is adjusted to the high frequency rate of the system so that at balance the pulse rate of both the system and the pulse generator are equal and result in zero count on the add-subtract counter 93. As the load increases an increased count is registered. The add-subtract counter accepts simultaneous or overlapping pulses without loss of count.

Having thus described my invention, I claim:

1. A mass measuring system comprising an elastic member to support a load and excited into free oscillation by said load, the frequency of the oscillation varying inversely with the load, first means operatively connected to the elastic member and arranged to initiate and sustain the oscillation of said elastic member, second means actuated by the oscillation to count said oscillation, and third means cooperating with the second means to linearize the frequency of the oscillation.

2. A mass measuring system comprising an elastic member to support a load and excited into free oscillation by said load, the frequency of the oscillation carrying inversely with said load, a continuously rotating sheave, brake mechanism on the sheave, first means connected to the brake mechanism and actuated by the oscillation of the elastic member in one direction to lock the brake mechanism to the sheave and cause said brake mechanism to move in the direction of rotation of the sheave, said movement sustaining the oscillation of the elastic member, second means actuated by the oscillation to count said oscillation, and third means cooperating with the second means to linearize the frequency of the oscillation.

3. A mass measuring system according to claim 2, wherein the brake mechanism comprises a plate, two discs engaging the periphery of the sheave, pins positioned eccentrically of the discs and spacing the discs apart, said pins being secured to an end portion of the plate and mounting the discs on said plate, said end portion of the plate being connected to the first means, the opposite end portion of the plate being rotatably supported on the sheave to prevent the plate tipping in the direction of said opposite end portion, and a cable wrapped around the sheave and passed over the pins with the opposite ends of the cable anchored to the end of the plate provided with the pins.

4. A mass measuring system according to claim 3, wherein the cable is twice passed over one of the pins secured to the end portion of the plate.

5. A mass measuring system according to claim 3, wherein the periphery of the sheave is provided with three grooves, each disc being engaged in an outside groove, and the cable is wrapped around the center groove.

6. A mass measuring system according to claim 3, a weight connected to the end portion of the plate provided with the pins to impart inertia to the plate during the oscillation of the elastic member in one direction.

7. A mass measuring system according to claim 6, wherein the weight is pivotally mounted in horizontal alignment with the axis of rotation of the sheave.

8. A mass measuring system comprising an elastic member supporting a load and excited into free oscillation by said load, the frequency of the oscillation of the elastic member varying inversely with said load, a continuously rotating sheave, brake mechanism on the sheave, means connected to the brake mechanism and actuated by the oscillation of the elastic member in one direction to lock the brake mechanism to the sheave and cause said brake mechanism to move in the direction of rotation of the sheave, said movement of the brake mechanism sustaining the oscillation of the elastic member, a disc of ferrous material having a cut-out and movable with the means connected to the brake mechanism, an induction-coil pivotally supported axially of said disc and positioned in the path of travel of the cut-out in the disc, an adjustable frequency pulse generator, and an add-subtract counter electrically connected to the induction-coil and the pulse generator to subtract count pulses of the induction-coil from the count pulses received from the adjustable frequency pulse generator and register the mass.

9. A mass measuring system as claimed in claim 8, wherein the disc is provided with a projection, and abutments movable with the induction coil and positioned on opposite sides of the projection whereby oscillation of the disc pivots the induction coil to different positions depending on the mass of the load.

10. A mass measuring system comprising a load platform pivotally mounted at one end, springs supporting the opposite end of the load platform and affecting oscillation of the load platform by a mass of the load, the frequency of oscillation varying inversely with the mass, first means operatively connected to the load platform and arranged to sustain the oscillation of said load platform, second means actuated by the first means to count the oscillation, and third means cooperating with the second means to linearize the frequency of oscillation.

11. A mass measuring system according to claim 10, wherein the load platform comprises a frame having side and end members, a conveyor belt idler supported by the frame side members adjacent to the pivoted end of the load platform, the springs being connected to the frame end member at the opposite end of the load platform, and the first means being connected to said frame end member and positioned laterally of one of the frame side members.

12. A mass measuring system according to claim 11, wherein the load platform frame is pivotally supported by spaced stringers, and all of the means being enclosed in a casing supported by one of said stringers.

References Cited
UNITED STATES PATENTS

| | | | |
|---|---|---|---|
| 2,305,783 | 12/1942 | Heymann et al. | 73—67 |
| 2,694,310 | 11/1954 | Pounds | 73—67 |
| 3,232,102 | 2/1966 | Goss et al. | 73—67.2 X |
| 3,273,380 | 9/1966 | Seney | 73—160 X |

DAVID SCHONBERG, *Primary Examiner.*